United States Patent
Liu

(10) Patent No.: US 6,779,804 B1
(45) Date of Patent: Aug. 24, 2004

(54) JOGGING STROLLER

(76) Inventor: Ssu-Liu Liu, 2F., No. 44, Lane 11, Kuang Fu N. Rd., Taipei (TW)

( * ) Notice: Subject to any disclaimer, the term of this patent is extended or adjusted under 35 U.S.C. 154(b) by 0 days.

(21) Appl. No.: 10/436,281

(22) Filed: May 13, 2003

(51) Int. Cl.[7] .............................................. B60B 33/00
(52) U.S. Cl. .................... 280/47.38; 280/647; 280/658; 16/35 R
(58) Field of Search ............................ 280/47.41, 642, 280/641, 38, 657, 658, 47.34, 47.38, 647, 648; 16/35 R, 35 D, 18 R

(56) References Cited

U.S. PATENT DOCUMENTS

| | | | | |
|---|---|---|---|---|
| 5,590,896 A | * | 1/1997 | Eichhorn | 280/642 |
| 5,660,435 A | * | 8/1997 | Eichhorn | 297/219.12 |
| 5,669,624 A | * | 9/1997 | Eichhorn | 280/642 |
| 6,196,572 B1 | * | 3/2001 | Durrin | 280/648 |
| 6,315,309 B1 | * | 11/2001 | Li et al. | 280/47.38 |
| 6,402,166 B1 | * | 6/2002 | Chiu | 280/47.38 |
| 6,449,801 B1 | * | 9/2002 | Durrin | 16/47 |
| 6,533,310 B2 | * | 3/2003 | O'Shea et al. | 280/644 |
| 6,671,926 B2 | * | 1/2004 | Huang | 16/35 R |
| 6,705,628 B2 | * | 3/2004 | Kahmann | 280/204 |
| 2002/0195784 A1 | * | 12/2002 | Cheng | 280/47.38 |

* cited by examiner

Primary Examiner—Brian L. Johnson
Assistant Examiner—J. Allen Shriver
(74) Attorney, Agent, or Firm—Troxell Law Office PLLC

(57) ABSTRACT

A jogging stroller in which a control block is coupled to the front fork and pivoted with the front fork to the front side of the front frame tube of the stroller frame, and an operation rod is provided in the control block and selectively shifted between a first position where the control block and the front fork are unlocked for a swivel motion relative to the front frame tube of the stroller frame, and a second position where the control block and the front fork are locked and prohibited from a swivel motion relative to the front frame tube of the stroller frame.

2 Claims, 5 Drawing Sheets

JOGGING STROLLER

BACKGROUND AND SUMMARY OF THE INVENTION

The present invention relates to baby strollers and, more particularly, to a jogging stroller, which can be adjusted to selectively lock or unlock the front fork and, which absorbs shocks when moving over an uneven road surface.

FIG. 1 illustrates a jogging stroller according to the prior art. According to this design, the front fork of the jogging stroller is fixedly secured to the stroller frame. This design has drawbacks. When jogging, the steering direction of the front wheel cannot be changed freely and quickly. There are known jogging strollers in which the front fork is swivel and can be locked by a lock pin. However, these jogging strollers produce much noise when moving over an uneven road surface.

The present invention has been accomplished to provide a jogging stroller, which eliminates the aforesaid drawbacks. According to one aspect of the present invention, a control block is coupled to the front fork and pivoted with the front fork to the front side of the front frame tube of the stroller frame, and an operation rod is perpendicularly connected to a locating pin in the control block and selectively shifted between a first position where the locating pin is disengaged from a positioning hole in a fixed mounting block at the front frame tube of the stroller frame and the control block and the front fork are unlocked for a swivel motion relative to the front frame tube of the stroller frame, and a second position where the locating pin is engaged into the positioning hole to lock the control block and the front fork and to prohibit the control block and the front fork from a swivel motion relative to the front frame tube of the stroller frame. According to another aspect of the present invention, the top end of the locating pin is tapered, the positioning hole of the fixed mounting block of the front frame tube is a tapered through hole fitting the tapered top end of the locating pin, and a spring is mounted in the control block to support the operation rod and to absorb shocks upon vibration of the control block with front fork.

DETAILED DESCRIPTION OF THE INVENTION

Figure 1:
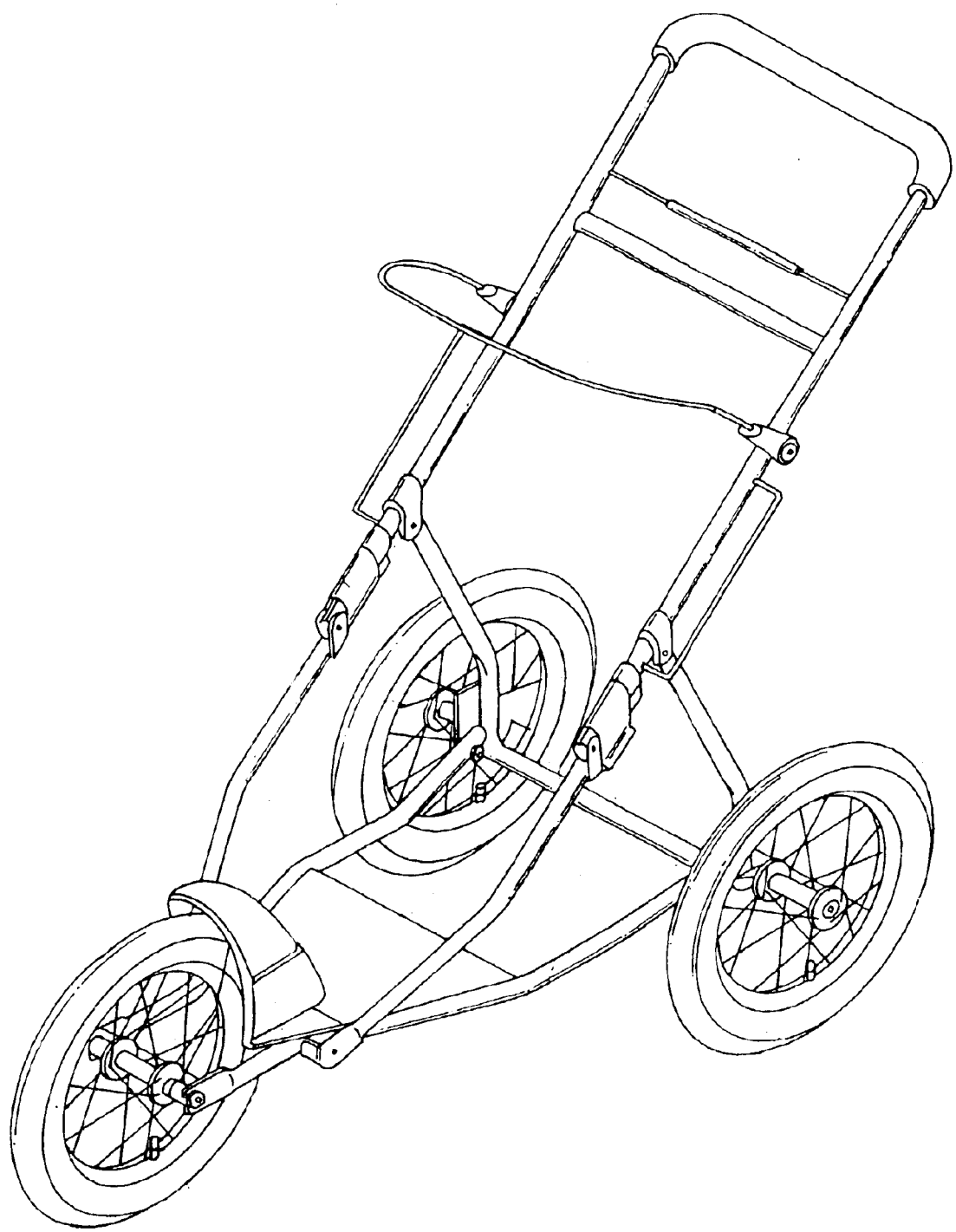
FIG. 1 is a perspective view of the frame structure of a jogging stroller according to the prior art.
Figure 2:
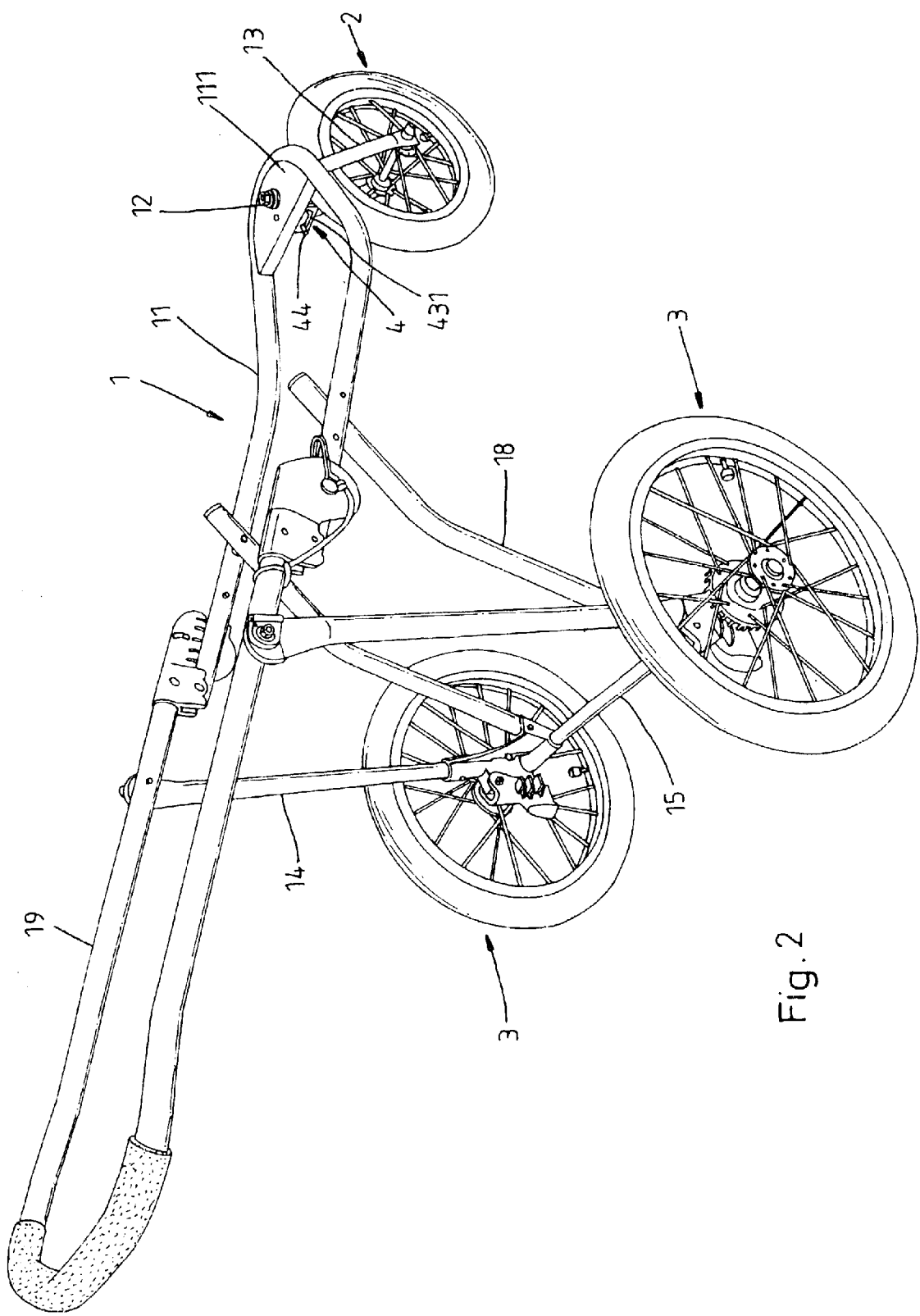
FIG. 2 is perspective view of the frame structure of a jogging stroller according to the present invention.
Figure 3:
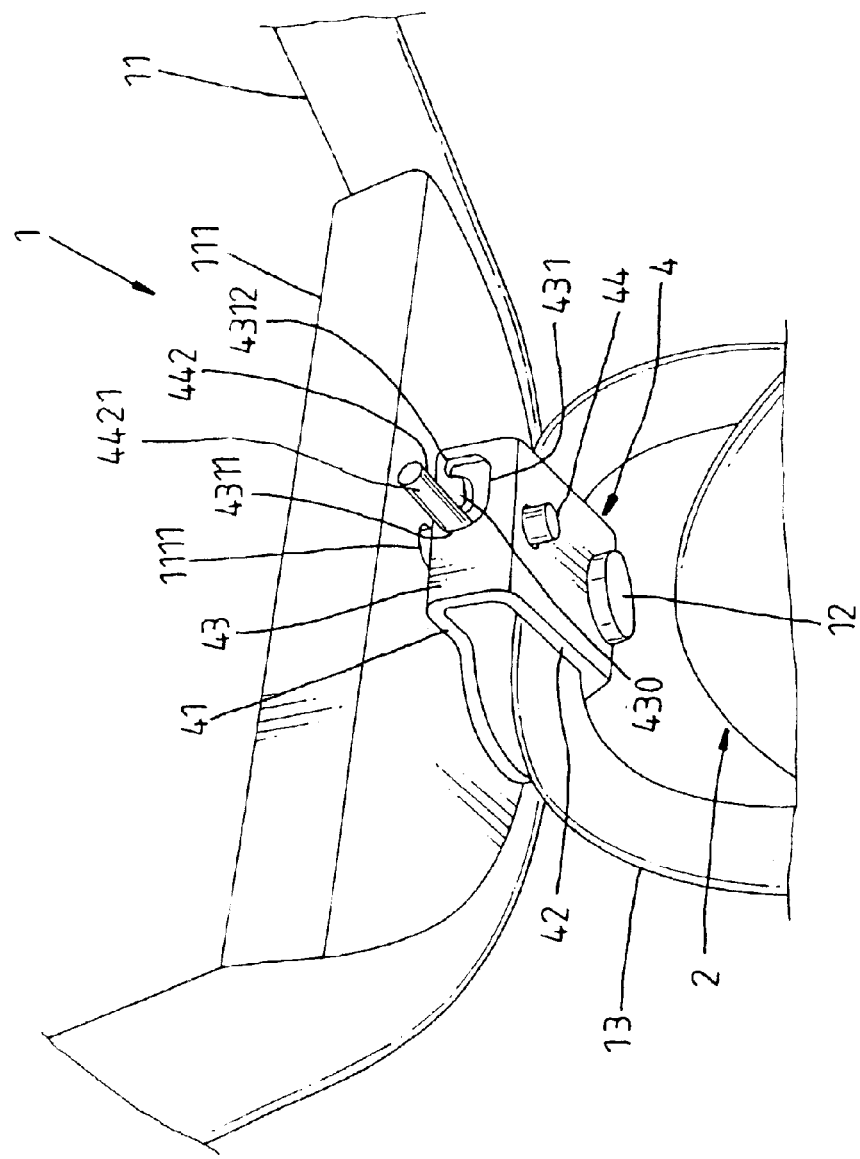
FIG. 3 is an enlarged view of a part of the jogging stroller shown in FIG. 2, showing the positioning of the control block between the front fork and the front frame tube.

Referring to FIG. 2, a jogging stroller 1 is shown comprising a substantially U-shaped front frame tube 11, a substantially U-shaped handlebar 19 coupled to the ends of the U-shaped front frame tube 11, two rear frame tubes 14 respectively pivoted to the ends of the handlebar 19 and spaced from the front frame bar 11, a front fork 13 pivoted to the front side (the curved middle part) of the front frame tube 11 by a pivot 12 and carrying a 12 inch front wheel 2 below the front frame tube 11, a rear wheel axle coupled between the rear frame tubes 14 and carrying a pair of 15.5 inch rear wheels 3 at the ends, and two side frame tubes 18 bilaterally coupled between the two ends of the U-shaped front frame tube 11 and the bottom ends of the rear frame tubes 14.

The main features are outlined hereinafter with reference to FIGS. 2~5. The front fork 13 has a top side (the middle part) provided with a control block 4, which is pivoted with the control block 4 to a fixed mounting block 111 at the front side (the curved middle part) of the U-shaped front frame tube 11 by the aforesaid pivot 12. The control block 4 comprises a horizontal top wall 41, a horizontal bottom wall 42, a vertical sidewall 43 connected between one end of the horizontal top wall 41 and one end of the horizontal bottom wall 42, a top through hole 411 cut through the horizontal top wall 41, a bottom through hole 421 cut through the horizontal bottom wall 42 in vertical alignment with the top through hole 411, a sliding slot 431 in the vertical sidewall 43, an inner locating notch 4311 and an outer locating notch 4312 respectively formed in the sliding slot 431 at two sides, a stop block 430 suspended in between the inner locating notch 4311 and the outer locating notch 4312, a locating pin 44 pivotally in the top through hole 411 and the bottom through hole 421 (see FIG. 5), operation rod 442 having an inner end perpendicularly fixedly fastened to the locating pin 44 and an outer end 4421 extended to the outside through the sliding slot 431 of the vertical sidewall 43, and a spring 46 sleeved onto the locating pin 44 and stopped between the operation rod 442 and the horizontal bottom wall 42 to impart an upward pressure to the operation rod 442 and the locating pin 44. Further, the fixed mounting block 111 of the front frame tube 11 has a positioning hole 1111, which receives the top end 441 of the locating pin 44.

Figure 4:
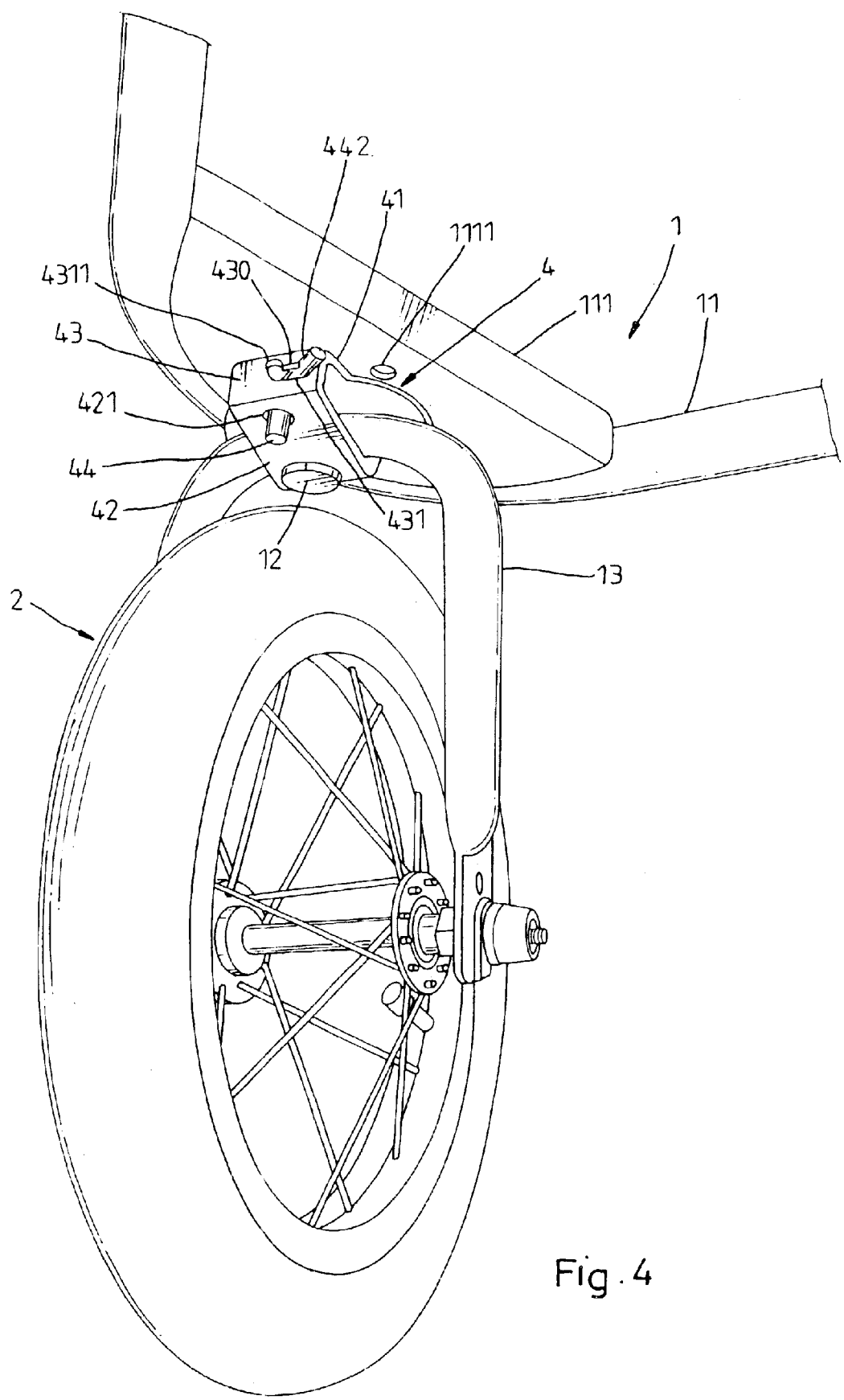
FIG. 4 is an oblique elevation in an enlarged scale of the front part of the jogging stroller according to the present invention.
Figure 5:
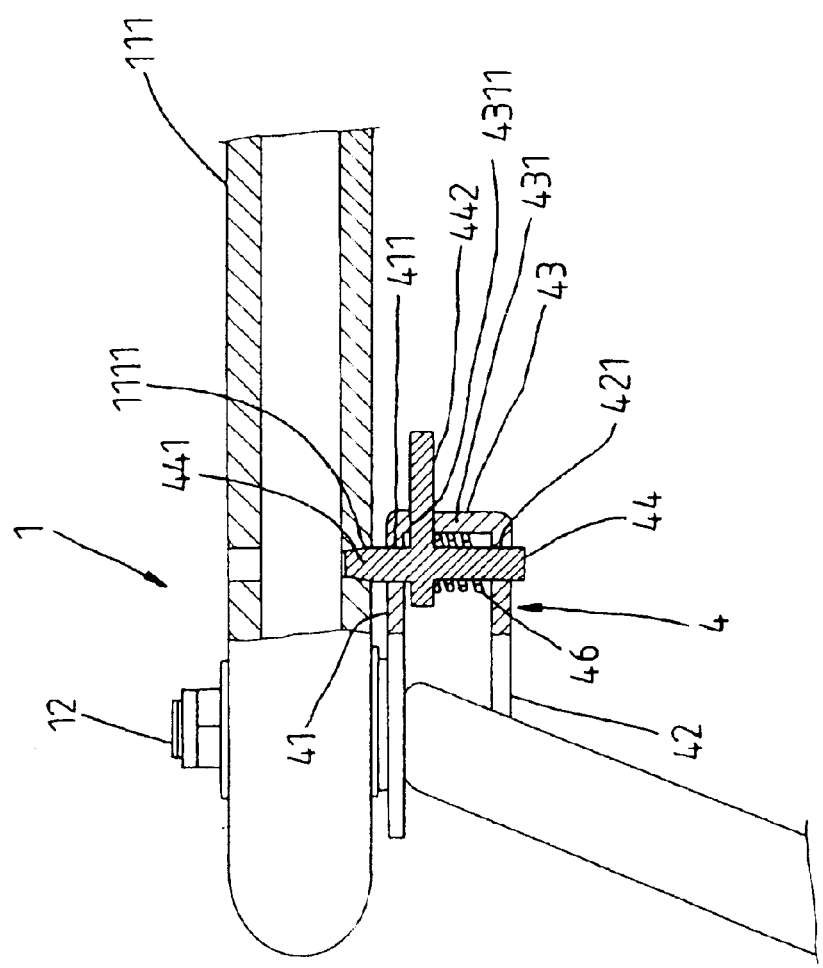
FIG. 5 is a sectional view in an enlarged scale of a part of the present invention, showing the locating pin engaged into the positioning hole.

When the user adjusted the operation rod 442 to engage the outer end 4421 into the outer locating notch 4312 in the sliding slot 431 in the vertical sidewall 43 of the control block 4, the top end 441 of the locating pin 44 is disengaged from the positioning hole 1111 of the fixed mounting block 111 of the front frame tube 11, for enabling the control block 4 to be rotated with the front fork 13 relative to the fixed mounting block 111 of the front frame tube 11 (see FIG. 4).

On the contrary, when the user adjusted the operation rod 442 to engage the outer end 4421 into the inner locating notch 4311 in the sliding slot 431 in the vertical sidewall 43 of the control block 4, the top end 441 of the locating pin 44 is forced by the spring 46 into the positioning hole 1111 of the fixed mounting block 111 of the front frame tube 11 to stop the front fork 13 and the control block 4 from a swivel motion relative to the front frame tube 11. Further, the positioning hole 111 is a tapered through hole fitting the tapered top end 441 of the locating pin 44. When the jogging stroller 1 moving over an uneven road surface, the locating pin 44 is moved with the spring 46 in the positioning hole 1111 of the fixed mounting block 111 of the front frame tube 11 to eliminate shocks.

As indicated above, the invention achieves the following advantages:

1. By means of operating the operation rod 442 to control the position of the locating pin 44, the front fork 13 is selectively controlled between a first position where the front fork 13 is locked, and a second position where the front fork 13 is unlocked and can be turned relative to the front frame tube 11.

2. By means of the effect of the spring 46 and the matching between the tapered positioning hole 1111 and the tapered top end 441 of the locating pin 44, the control block 4 eliminates shocks when the jogging stroller 1 moving over an uneven road surface.

What is claimed is:

1. A wheel mounting structure comprising:

a substantially U-shaped front frame tube, said U-shaped front frame tube having a curved middle part disposed at a front side, a substantially U-shaped handlebar coupled to two distal ends of said U-shaped front frame tube, two rear frame tubes respectively pivoted to two distal ends of said handlebar and spaced from said front frame tube at a distance, a pivot, a front fork carrying a 12 inch front wheel, said front fork having a top side pivoted to the curved middle part of said front frame tube by said pivot, a rear wheel axle coupled between said rear frame tubes and carrying a pair of 15.5 inch rear wheels, and two side frame tubes bilaterally coupled between said U-shaped front frame tube and said rear frame tubes, wherein:

said U-shaped front frame tube has a fixed mounting block at the curved middle part thereof, said fixed mounting block having a positioning hole;

said front fork has a control block coupled to the top side thereof and pivoted with the top side to said fixed mounting block of said U-shaped front frame tube by said pivot, said control block comprising a horizontal top wall, a horizontal bottom wall, a vertical sidewall connected between one end of said horizontal top wall and one end of said horizontal bottom wall, a top through hole cut through said horizontal top wall, a bottom through hole cut through said horizontal bottom wall in vertical alignment with said top through hole, a sliding slot in said vertical sidewall, an inner locating notch and an outer locating notch respectively formed in said sliding slot at two sides, a stop block suspended in between said inner locating notch and said outer locating notch, a locating pin pivotally mounted in said top through hole and said bottom through hole, an operation rod perpendicularly fixedly fastened to said locating pin, and a spring sleeved onto said locating pin and stopped between said operation rod and said horizontal bottom wall to impart an upward pressure to said operation rod and said locating pin, said operation rod having an outer end extended out of the sliding slot of said vertical sidewall for operation by hand to shift said operation rod between a first position where said operation rod is engaged into said outer locating notch to hold said locating pin outside the positioning hole of said fixed mounting block of said U-shaped front frame tube for enabling said control block to be turned with said front fork about said pivot relative to said U-shaped front frame tube, and a second position where said operation rod is engaged into said inner locating notch, to hold said locating pin inside the positioning hole of said fixed mounting block of said U-shaped front frame tube, prohibiting said control block and said front fork from a swivel motion relative to said U-shaped front tube.

2. The wheel mounting structure as claimed in claim 1, wherein the top end of said locating pin is tapered, and the positioning hole of said fixed mounting block of said front frame tube is a tapered through hole fitting the tapered top end of said locating pin.

* * * * *